CODED RECORDS AND PRODUCING APPARATUS THEREFOR

Filed Jan. 12, 1962

3,143,642

CODED RECORDS AND PRODUCING APPARATUS THEREFOR

Manrico Compare, Ivrea, Italy, assignor to Ing. C. Olivetti & C., S.p.A., Ivrea, Italy, a corporation of Italy Filed Jan. 12, 1962, Ser. No. 165,924
Claims priority, application Italy Jan. 16, 1961
4 Claims. (Cl. 235—61.12)

Figure 1:
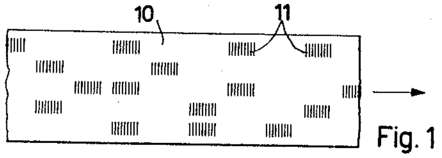

This invention relates broadly to the provision of, as well as manner of production, of record members which by recordings of index marks at discrete, combinational or single points thereon are capable subsequently for employment to effect selective machinery control in a prescribed manner. Record members of this general kind are widely used in the control of data processing systems, teleprinters and automatic machining machinery.

Generally, the stated record members are either in the form of a running tape or the form of a card. The recordings commonly consist of perforations. Sometimes they consist of incomplete perforations producing no loose chad. Either of these forms of records are materially weakened by the recordings and especially if the record is a tape of paper, it is very easily subject to rupture. The chadless form of perforated record presents also a problem because it does not lend itself to satisfactorily high feeding speeds through machines. On the other hand in connection with perforated records the problem is that the char must be routed out of the machine and must not get into the mechanism. Recordings on record members consist sometimes of printed marks but if the ink supply fails or the marks become smudged, a faulty record results which is incapable of useful interpretation by sensing devices. In still another known form of record member the recording marks consist of areas of indented serrations, or the equivalent, which are capable of being sensed for machinery controlling purposes, either mechanically, electromechanically, photoelectrically, or otherwise.

It has been found that the latter kind of record member affords the advantage of superior strength especially in the case of record tapes. Because it is not subject to smudging, it is also superior to records having printed record marks.

It is a broad object of the invention to provide an efficient machine for producing on a record member detectable index marks while such record member is being fed through the machine, there being no stoppage of the record member to receive the index mark or marks, so that the record member is preparable at an utmost rate of speed.

It is one object of the invention to provide an efficient machine for producing selectively record marks on a record member at a very high rate of speed and in an economical manner.

It is particularly also an object of the invention to provide improved devices for producing at a high rate of speed on a record member, record marks consisting of grained small fields of indentations which are analyzable for subsequently effecting automatic machinery control.

Another important object of the invention is the provision of efficient devices to produce at given index points on a record member, record marks which are directionally of differently grained texture, such marks by reason of the differentiating grain being imported thereto differentiating meanings which are capable of detection as such for subsequent machine controlling purposes.

An object of the invention is the provision of a record member which has data recordings at discrete locations thereon, and such recordings consisting of small fields of indentation made in a plurality of directionally different grains for increased differential recording capacity of the record member.

Other objects and advantages will become evident from the following specification and the accompanying drawings.

Figure 4:
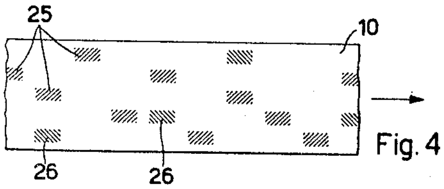
Figure 5:
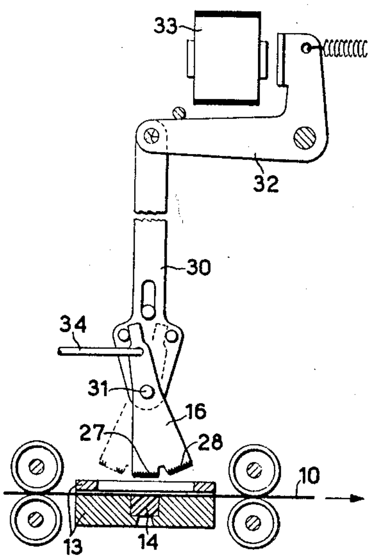
Figure 2:
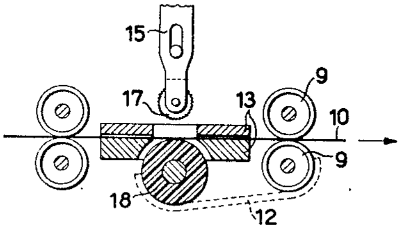
Figure 3:
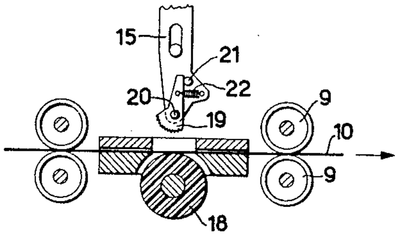

In said drawings:

FIGURE 1 illustrates a record member in the form of tape having record marks consisting of fields of grained impressions thereon, FIGURES 2 and 3 are sectional side elevations of two different forms of devices for producing the rough-texture recordings of the general kind shown in the record member of FIGURE 1, FIGURE 4 is a view similar to that of FIGURE 1, but illustrates a record member having recording marks of grained fields of indentations having one or another directional disposition, and FIGURE 5 is a sectional side elevation similar to that of FIGURES 2 and 3, showing an exemplary mechanism whereby the differentiating recording marks of FIGURE 4 are produceable.

Specifically referring to the machine of FIGURE 2, a record member 10 in the form of a tape is shown to be fed by two feed rolls 9 over a roller 18 which extends transversely of and directly underlies the tape, the direction of feed of the tape being indicated by an arrow. Arranged in a row behind each other over a recording station at the roller 18 are a number of rolling elements 17 each rotatively borne on a vertically guided slide 15 for movement down on the record member 10. Said rolling elements 17 have a rough-texture peripheral surface while the roller 18 has a cylindrical exterior of resilient material such as rubber. Whenever a rolling element 17 is transitorily moved downwardly by its slide it will by cooperation with the rotating roller 18 impress the record member 10 with a field of indentations constituting a detectable index mark 11. In FIGURE 1 the indentations are shown as serrations.

The recording operations take place always as the tape 10 is being fed and as the roller 18 is being turned, obviously at least one of the feed rollers 9 being interconnected with the roller 18, as by a belt indicated at 12, so that the peripheral speed of the roller 18 is the same as the feeding speed of the tape 10. There are pauses in the feed of the tape 10 only if recording operations do follow each other at a rate slower than the required time to give the recordings a normal separation, the means for giving such pauses being not shown. A guiding passage for the tape 10 is provided by two vertically spaced plates 13, the upper one of which has a clearance opening for the rolling elements 17 to descend down on the roller 18.

Whenever recordings are effected in fast succession, the record tape travels through the machine without stopping and for that reason extremely high rates of recording speeds are attained.

The recording device illustrated in FIGURE 3 is similar to that of FIGURE 2 and operates in substantially the same manner. The rolling elements 19 in FIGURE 3, however consist of rolling sectors instead of full rollers 17. Such sectors 19 are pivotally carried at 20 on their supporting slides 15 and have each an upreaching arm normally abutting a pin 21 under the tension of a spring 22. Each sector 19 when moved down by its slide 15 will be rotated the same as the full roller 17. The downward operation being transitory, it follows that at the conclusion of each recording mark being made the sector 19 will recover its normal position on the slide 15.

The machine shown in FIGURE 5 produces a record tape 10 with index marks 25 and 26 of different select directional grain, as illustrated in FIGURE 4. The structure for producing such record may comprise a row of recording elements in the form of plungers 16, each having on its bottom a pair of directional-grain indenting surfaces 27 and 28 selectable for impressing the record member or tape 10. Below the plungers 16 there extends a strip 14 of yieldable material, such as rubber. A guiding passage for the record tape is provided by two vertically spaced plates 13, the lower one having the strip 14 imbedded therein and the upper one being provided with clearance holes for the plungers 16. The plungers 16 are pivoted at 31 on vertically movable elements 30 which at their upper ends have connection with levers 32 which are operable, as for example by electromagnets 33, to operate the plungers 16 thereon downwardly to effect recordings on the tape 10. Each plunger 16 is connected to an individual controller formed of a link 34 adapted to be given one or another position, thereby to give the plunger 16 one or another rotative position on its movable element 30. The controllers 34 may be operated selectively by electromagnets, not shown. It will be seen that each plunger 16, if operated downwardly, will effect the marking of the tape in one or another directional grain, depending on whether the plunger 16 in association with its operation is given or occupies one or the other of its rotative positions.

The controllers 34 related to the different plungers 16 may be provided at staggered levels for non-interference with each other. The indenting surfaces 27 and 28 on the plungers 16 consist preferably of parallel ridges producing serrated indentations in the record member 10, which as seen in FIGURE 4 may have two opposite directional grains according to marks, 25 and respectively 26. It is understood that the device is easily adaptable to produce a greater number of variations of directional grain than two, if that is desirable, by providing a plunger 16 with a corresponding number of directional-grain indenting surfaces.

The record marks produced by the described devices of the invention may be analysed or read by devices generally well known in the art.

The index marks of differentiating grain may be produced under controlling influence of signals of different polarity, but the invention is not restricted to such manner of control. It is obvious that by the provision for effecting the recordings in different directional grain, the number of different code combinations possible for any given number of code units is immensely increased without any requirement for enlargement of the recording member.

The scope of the invention is indicated by the following claims.

I claim:

1. A machine controlling record member,
(*a*) bearing data-representative recordings at discrete recording points,
(*b*) the recordings being comprised of areas of grained texture indentations of different select directional grain,
(*c*) the recordings by reason of being made in different directional grain being capable of differentating analyzation in a subsequent employment of the record member for effecting selective automatic machinery control.

2. A machine controlling record member,
(*a*) bearing data-representative recordings at discrete recording points,
(*b*) such recordings being each comprised of area indentations of directionally select serrations impressed on the record member, whereby such recordings by reason of the directional grain they possess are capable of differentiating analyzation.

3. A machine-controlling record member,
(*a*) bearing data-representative recordings at discrete recording points,
(*b*) the recording of each point being comprised of a plurality of area indentations embossed in said record member without cutting same,
(*c*) said indentations being each other parallel and at a predetermined mutual distance.

4. A machine-controlling record member,
(*a*) bearing data-representative recordings at discrete recording points,
(*b*) the recording of each point being comprised of a plurality of area indentations embossed in said record member without cutting same,
(*c*) said indentations being each other parallel and at a constant mutual distance,
(*d*) said indentations being variably inclined from one recording to another to be capable of differential analysis according to their inclination.

References Cited in the file of this patent

UNITED STATES PATENTS

| | | |
|---|---|---|
| 753,662 | Breseman | Mar. 1, 1904 |
| 1,360,723 | Comp | Nov. 30, 1920 |
| 3,037,695 | Dickinson | June 5, 1962 |
| 3,045,905 | Tarasuk | July 24, 1962 |